United States Patent
Campbell, Jr.

(10) Patent No.: US 7,115,086 B1
(45) Date of Patent: Oct. 3, 2006

(54) QUEUE-BASED BAG FORMING SYSTEM AND METHOD

(75) Inventor: Robert L. Campbell, Jr., Hickory, NC (US)

(73) Assignee: Automated Solutions, LLC, Hickory, NC (US)

(*) Notice: Subject to any disclaimer, the term of this patent is extended or adjusted under 35 U.S.C. 154(b) by 13 days.

(21) Appl. No.: 10/923,308

(22) Filed: Aug. 20, 2004

(51) Int. Cl.
B31B 1/64 (2006.01)

(52) U.S. Cl. ............... 493/189; 493/198; 493/222; 493/381; 493/919

(58) Field of Classification Search ............... 493/222, 493/335, 345, 346, 380, 381, 917, 919, 922, 493/925, 189, 190, 193, 198, 204, 206, 209; 156/515, 513
See application file for complete search history.

(56) References Cited

U.S. PATENT DOCUMENTS

| | | | |
|---|---|---|---|
| 1,770,865 A | 7/1930 | Royal | |
| 1,814,967 A | 7/1931 | Royal | |
| 1,989,794 A * | 2/1935 | Duvall | 428/102 |
| 2,171,259 A | 8/1939 | Scott | |
| 2,265,075 A | 12/1941 | Knuetter | |
| 2,474,770 A * | 6/1949 | Yount et al. | 206/326 |
| 2,805,973 A | 9/1957 | Klasing et al. | |
| 2,897,109 A | 7/1959 | Voigtman | |
| 3,044,429 A | 7/1962 | Levi | |
| 3,044,517 A | 7/1962 | Levi | |
| 3,111,154 A | 11/1963 | Levi | |
| 3,248,040 A | 4/1966 | Friedman | |
| 3,409,494 A * | 11/1968 | Korzinek | 156/515 |
| 3,506,049 A | 4/1970 | Gerard | |
| 3,576,059 A | 4/1971 | Pearson | |
| 3,669,252 A | 6/1972 | Evans | |
| 3,734,394 A | 5/1973 | Dooley | |
| 3,744,360 A | 7/1973 | Currie et al. | |
| 3,750,872 A | 8/1973 | Bobb | |
| 3,827,341 A | 8/1974 | Stage | |
| 3,891,138 A | 6/1975 | Glas | |
| 3,938,661 A | 2/1976 | Carmody | |
| 3,948,436 A | 4/1976 | Bambara | |
| 3,982,991 A * | 9/1976 | Hamm et al. | 156/515 |
| 3,986,661 A | 10/1976 | Dreher | |
| 4,011,798 A | 3/1977 | Bambara et al. | |
| 4,019,947 A * | 4/1977 | Stock et al. | 156/510 |
| 4,029,539 A * | 6/1977 | Doll | 156/513 |
| 4,385,427 A | 5/1983 | Fraiser | |
| 4,507,163 A | 3/1985 | Menard | |
| 4,825,915 A * | 5/1989 | Hess et al. | 141/337 |
| 4,878,765 A | 11/1989 | Watkins et al. | |
| 4,878,974 A | 11/1989 | Kagawa | |
| 4,937,131 A | 6/1990 | Baldacci et al. | |
| 4,987,997 A | 1/1991 | Raszewski et al. | |

(Continued)

*Primary Examiner*—Hemant M. Desai
(74) *Attorney, Agent, or Firm*—Kennedy Covington Lobdell & Hickman, LLP (57) ABSTRACT

A method of forming a series of bags for bulky articles from rolled thermoplastic film and padding element includes arranging a linear, longitudinally traveling queue of layers of film and padding element according to a set of desired bag dimensions and characteristics and controlling the advancement of the queue to make padding element and seal cuts to form the bags. The invention also includes a system for fabricating bags substantially in the manner identified in the method of the present invention, as well as a method of forming seal cuts in which an envelope is first clamped, then sealed and cut by heat and pressure, then allowed to cool before being released.

8 Claims, 9 Drawing Sheets

U.S. PATENT DOCUMENTS

| | | | |
|---|---|---|---|
| 5,045,041 A * | 9/1991 | Murphy | 493/194 |
| 5,057,169 A | 10/1991 | Adelman | |
| 5,143,133 A | 9/1992 | Speckman | |
| 5,188,581 A | 2/1993 | Baldacci | |
| 5,407,078 A | 4/1995 | Strauser | |
| 5,465,842 A | 11/1995 | Utley | |
| 5,474,185 A | 12/1995 | Franke | |
| 5,701,999 A | 12/1997 | Phillips, II et al. | |
| 5,881,883 A | 3/1999 | Siegelman | |
| 5,882,776 A | 3/1999 | Bambara et al. | |
| 6,006,905 A * | 12/1999 | Campbell, Jr. | 206/326 |
| 6,189,692 B1 * | 2/2001 | Campbell, Jr. | 206/326 |
| 6,428,459 B1 | 8/2002 | Campbell, Jr. | |
| 6,719,867 B1 * | 4/2004 | Mileti et al. | 156/251 |
| 2004/0231291 A1 * | 11/2004 | Slovencik et al. | 53/403 |

* cited by examiner

QUEUE-BASED BAG FORMING SYSTEM AND METHOD

FIELD OF THE PRESENT INVENTION

The present invention relates generally to a system and method for forming padded bags of the type typically used to package bulky articles such as pieces of furniture, and more specifically to such a system wherein bags of differing specifications, including windowed bags, may be formed on an in-line basis from a single production machine.

BACKGROUND OF THE PRESENT INVENTION

Bulky articles such as pieces of furniture are typically assembled at a manufacturing facility according to custom instructions based upon a customer or retailer order. Because of a wide variety of styles, constructions, fabrics, and the like within a single manufacturer's catalog, because such items are comparatively expensive, and because of traditional production practices, it is common for a furniture manufacturing facility to produce pieces of furniture of differing lengths on a piece-by-piece basis, rather than manufacturing a run of a single style all at the same time.

Because these articles often utilize valuable materials and skilled handiwork, and because they must be shipped great distances and protected during shipment, it is common to place each article in a plastic bag together with some sort of padding element. The automation of this process has resulted in the common use of a bag formed substantially as follows. A layer of foam or other suitable padding element is sandwiched between two layers of plastic film and sealed along its longitudinal edges. The sandwich is then folded along a central longitudinal line to form an envelope, and the envelope is made into a bag of an appropriate length by end-seal-cutting at longitudinally spaced locations corresponding to the desired length. The bag may then be placed over the bulky article so that the padding element surrounds the bulky article.

It is typical for these bags to be manufactured by a bag manufacturer in a series of standard sizes and provided to the furniture manufacturer on rolls or in packages of bags, sized based upon the largest item in the furniture manufacturer's catalog.

Those who are skilled in the art of furniture packaging will recognize that the padding element, which is generally opaque (as opposed to the generally transparent film), serves to obstruct easy vision of the article contained within the bag. As the bulky article may be held in a warehouse prior to delivery, a warehouse worker seeking to identify the article, which is generally a custom item specific to a particular customer's order, must generally rely on markings on the bag or open each bag to identify the desired article.

However, it has also been recognized that the type of damage against which the padding element protects is generally only realized at the ends of each piece, such as on the arms of a sofa. Therefore, one practice is to dispose the padding element only at the ends of the bag, leaving a "window" for the easy identification of the contents of the bag. This allows the bag manufacturer to realize a materials costs savings while providing for easier warehousing processes, but doing so introduces special difficulties into the manufacturing process. U.S. Pat. No. 6,428,459, the disclosure of which is incorporated herein by reference, identifies a method of forming a windowed bag for a bulky article which overcomes many of the special difficulties associated therewith.

A manufacturer offering numerous sizes of furniture, all custom-produced on a piece-by-piece basis at a single manufacturing point, must decide how many bags of each size to keep in stock, and this decision may hinge upon the suitability of a particular standard-size bag for use with a particular size of a piece of furniture. The risk associated with using a bag that fits the item improperly is that the item will incur damage during shipment, which results in a loss to the manufacturer and irritation and delay on the part of the customer. However, given a wide variety of sizes and the unpredictable nature of the business of custom furniture manufacturing, it is often economically infeasible to carry a supply of pre-made bags of every size needed, particularly if the bags vary both in their length and in the arrangement of the padding element. Most manufacturers keep only one to three sizes of bags in stock, each sized for the largest sofa, love seat, and chair, for instance, in the manufacturer's catalog. This practice is wasteful of bagging materials when these bags are used on smaller items.

It would therefore be helpful if a manufacturer could produce bags of custom sizes on a per-piece basis, such that a custom bag of exactly the right length and exactly the right padding element arrangement is produced only when needed.

A further problem associated with the formation of bags is in the length of the production line needed to form a single windowed bag. A typical arrangement for forming windowed bags includes two rolls of plastic film and a roll of padding element, which are rolled out into a sandwich, center-folded, and seal-cut along the ends to a desired length. If a windowed bag is to be formed, however, the padding element must be cut and the feeding of the padding element roll stopped briefly in relation to the feeding of the film rolls to form the region in which no padding element is present. It can be rather easily appreciated that this cut must be made before the sandwich is folded, and indeed just as the sandwich is formed; otherwise, access to the padding element is not available.

However, in a typical bag forming apparatus, the distance along the production line required for forming the sandwich, folding the sandwich, and sealing the end is longer than a typical bag, and may in some cases be longer than the total length of two, three, or more bags. This does not present a problem when bags of the same size are formed all at the same time, but if only a single bag of accustom size and arrangement is needed, then a substantial amount of waste is generated as the rolls must be advanced far enough to allow that custom bag to reach the end of the production line.

A further problem associated with the formation of windowed bags is the tendency of the padding element to shrink away from the heat sealing mechanism and to become disconnected within the film-pad sandwich. The ends are typically seal-cut using a hot wire sealing arrangement that is applied with a temperature sufficient to capture the end of the padding element within the seal by melting it into the thermoplastic. However, because the padding element is largely free to "float" within the sandwich, if a hot wire is applied to the seal-cut location, the unmelted portion of the padding element tends not to remain integral with the melted portion of the padding element, and this separation allows the unmelted portion to float freely. This is undesirable because the padding element needs to remain at the ends of the bag. This problem could be solved by attaching the padding element along its face to the film layers, but this would reduce the effectiveness of the padding element to prevent damage to the bulky article, and in certain applications (such as shrink-wrapping applications) may cause the padding element to become rumpled.

What is needed, then, is a bag forming apparatus and method that overcomes the noted disadvantages of conventional systems to allow single window bags of custom sizes and configurations to be produced in a desired order on a single machine, in such a manner that the padding elements are captured at their ends in the end-seals.

SUMMARY OF THE PRESENT INVENTION

In accordance with the above-identified needs, the present invention principally includes a method of forming a series of bags having varying desired characteristics and dimensions for containing a like number of bulky articles, each of which bulky articles requires a bag having one of the varied characteristics and dimensions, using a pair of thermoplastic film rolls and a padding element roll.

The method includes a series of steps substantially as described hereinbelow. The film rolls and the padding element roll are driveable to advance out layers of film and padding, and depending upon the desired bag characteristics and dimensions, the film rolls and padding element roll may be selectively advanced (or not advanced) in a coordinated but not continuous fashion in order to arrange a linear, longitudinally traveling queue of layers of film and padding element.

In coordination with the step of advancing or not advancing the padding element roll, the padding element may be cut across its transverse extent using a knife or other conventional means, such that as the padding element is cut and the film rolls are advanced while the padding element roll is not advanced, a region is formed in the queue whereat no padding element is present between the film layers. This permits the formation of what will be, in the context of a finished bag, a window within the bag. This transverse cut is made at one of at least two cut points, the other of which will be discussed below.

Once the window has been formed within the queue, no further padding element-only cuts need be made, so the film layers and the padding element layer are then formed into a sandwich including the layers of film disposed about the padding element. At this point the longitudinal edges of the sandwich may be sealed so as to contain the padding element within the sandwich. The sandwich is then be folded longitudinally about a centerline thereof to form an envelope.

As the queue continues to be advanced, the point at which one bag is to end and another is to begin reaches a second cut point, at which point a transverse seal-cut is formed across the envelope to complete the formation of the first bag with a sealed end, at least partially to sever the first bag from the queue, and to seal the leading edge of the next bag in the line. This step is accomplished according to the desired bag characteristics and dimensions.

Overarching all of the foregoing steps is a further step wherein the longitudinal motion of the queue is controlled by selectively advancing or stopping the queue to facilitate the steps of cutting the padding element or selectively forming one of the transverse seal-cuts, according to a position of the queue with respect to one of the cut points. Those skilled within the art will recognize that the queue is not advanced unless an order for a bag has been placed with the control mechanism, such that bags in various stages of completion may be held within the queue and finished only when they have been forced forward in the queue, by bags ordered after that bag, to and through the final cut point.

The method of the present invention may further include, as part of the step of forming transverse seal-cuts, the step of interposing the envelope between a sealer bar and a compliant anvil, the sealer bar having an initial temperature below the softening point of the plastic and comprising a sealing surface and an optional ridge projecting therefrom for increasing clamping pressure along a cut line. The sealing surface itself is smaller, widthwise, than the sealer bar, so that on either side of the sealing surface there are regions where pressure may be applied without applying heat. A selected clamping pressure, sufficient to compress the padding element to a near-solid state in order to facilitate capture and heat transfer, is applied in order to clamp the layers of the film envelope between the sealer bar and the anvil. Rather than applying the clamping pressure to the sealer bar, the clamping pressure may be applied to the anvil. The sealing surface is then heated to a selected sealing temperature, such that the layer of padding element is captured in the layers of thermoplastic film in the region of the sealing surface and, because of the effect of additional pressure in the area of the ridge if it is present, the envelope is at least partially severed in the region of the ridge to define the end of a first bag and the leading edge of the next bag. In the regions of the sealer bar outside the sealing surface, the padding element is held in place so that it cannot shrink away from the seal. The sealing surface and plastic are then cooled (or allowed to cool) to a temperature below the softening point of the plastic and the clamping pressure is removed. Alternatively to the use of a severing ridge, a seal band with no ridge and a cutting apparatus such as a knife could be used to separate one bag from another.

In a further feature of the present invention, a nonstick layer may be interposed between the sealer bar and the envelope. If a perforated cut is preferred, a plurality of heat conducting members may be interposed between the sealer bar and the envelope to form retention regions connecting the two bags, such that the seal-cut is a perforation. These heat conducting members may be spring wires, spring bands, or any other material suitable for drawing, in a localized fashion, sufficient heat away from the ridge such that the heat remaining in the area is insufficient to sever the bag. The dimensions of these areas will necessarily depend upon the characteristics of the materials being sealed and will preferably be chosen to allow the bags to be disconnected from each other fairly easily. These conducting members should be electrically isolated from the sealer bar so as to prevent a short circuit from developing.

The resulting bags have the desired characteristics (including window size and location) and dimensions (principally the length thereof).

The present invention also includes an apparatus or system for accomplishing the above-described method, including a pair of thermoplastic film rolls each feeding a layer of a thermoplastic film; a padding element roll selectively driveable to feed a layer of a padding element interbetween the layers of thermoplastic film to form a sandwich; a knife for cutting the padding element to form a window in one of the bags; means for folding the sandwich to form an envelope; a seal-cutter for forming a seal-cut whereby a trailing end of a first bag and a leading end of a second bag are sealed and at least partially cut; and a microprocessor control for controlling operation of the knife, operation of the seal-cutter, and coordinated movement of a queue comprising the layers of film and the layer of padding element, according to the varying desired characteristics and dimensions of the bags.

The system may further include means for longitudinally sealing the sandwich along edges thereof. The seal-cutter may include a compliant anvil and a sealer bar optionally having a central ridge or a heat-resistant non-conducting wire for increasing clamping pressure along a cut line, the sealer bar being selectively heatable to a desired temperature and the sealer bar and the anvil cooperating to apply pressure to the envelope. The seal-cutter may be configured to produce a fully severing cut or a perforated cut, or to perform a cutting operation separately from the sealing operation.

Additionally, a method of forming seal-cuts substantially as described above as part of the method of forming a series of bags forms an independent part of the present invention.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

The present invention includes a method and a system for forming a series of bags having varying desired characteristics and dimensions for containing a like number of bulky articles each requiring one of the bags of varied characteristics and dimensions. Generally, the bags are to be constructed in three layers: two layers of thermoplastic film and a layer of a padding element. The film may be made of any suitable thermoplastic of any desired thickness, and the padding element may be a thermoplastic foam, a polyester pad, a synthetic fabric, or any other suitable material capable of being heat-sealed into a captured relationship with the thermoplastic film. By way of example, the present invention has been shown to be useful with a polyethylene film of 1 mil to 5 mil thickness and either a polyethylene foam of ³⁄₃₂" thickness or a polyester pad of 3.5-oz. weight (thickness of approximately 0.020"). However, those skilled in the art will recognize that a wide variety of materials are susceptible of use within the method and system of the present invention, and that adjustments in the sealing temperature, the sealing pressure, and the size of the sealing region may be required to produce a suitable bag, based upon the particular materials selected.

The present invention is useful to make, among other bags, a bag of the general type and specifications described in U.S. Pat. No. 6,428,459, as depicted in the drawings thereof, but having certain preferred characteristics not identified therein but described hereinbelow.

Figure 1:
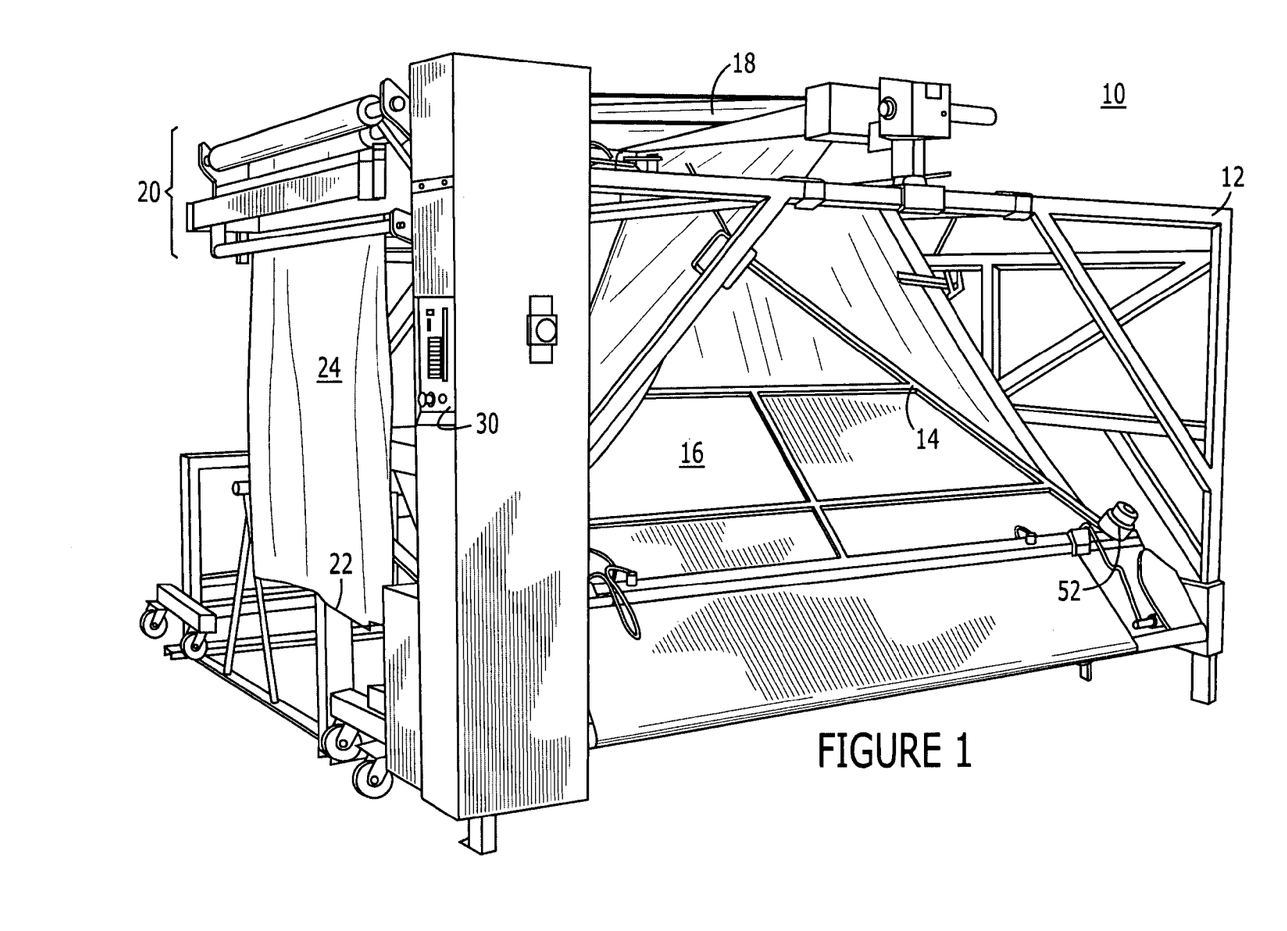
FIG. 1 is a general perspective view of a device according to the present invention.

Referring now to the drawings of the present application, a system 10 for forming a series of bags having varying desired characteristics and dimensions is depicted in a general perspective view. The system 10 includes a frame 12 which serves to contain and arrange the various elements of the system 10 in order to produce bags for bulky articles (not shown). The principal features of the invention shown in FIG. 1 are the A-frame 14, which is used to fold a film-foam sandwich 16 into an envelope 18, and a seal-cut apparatus 20, which is used to form the ends 22 of bags 24, simultaneously forming a trailing end of a first bag and a leading end of a second bag in a manner that will be described in greater detail below. FIG. 1 is intended to depict a preferred general arrangement of the apparatus 10, but those skilled in the art will recognize that a wide variety of other arrangements are possible without departing from the scope of the present invention and will depend largely on the amount of space available for housing the apparatus 10. Also, several key elements of the invention not shown in FIG. 1 will be shown and described in connection with other figures.

Also visible in FIG. 1 is a control pad 30, which contains a microprocessor control (see FIG. 2) for controlling the operation of the apparatus 10, including the operation of a knife (see FIG. 2), operation of the seal-cutter 20, and coordinated movement of a queue 100 (see FIG. 3) comprising the layers of film and the layer of padding element (see FIG. 2), according to the varying desired characteristics and dimensions of the bags.

Figure 2:
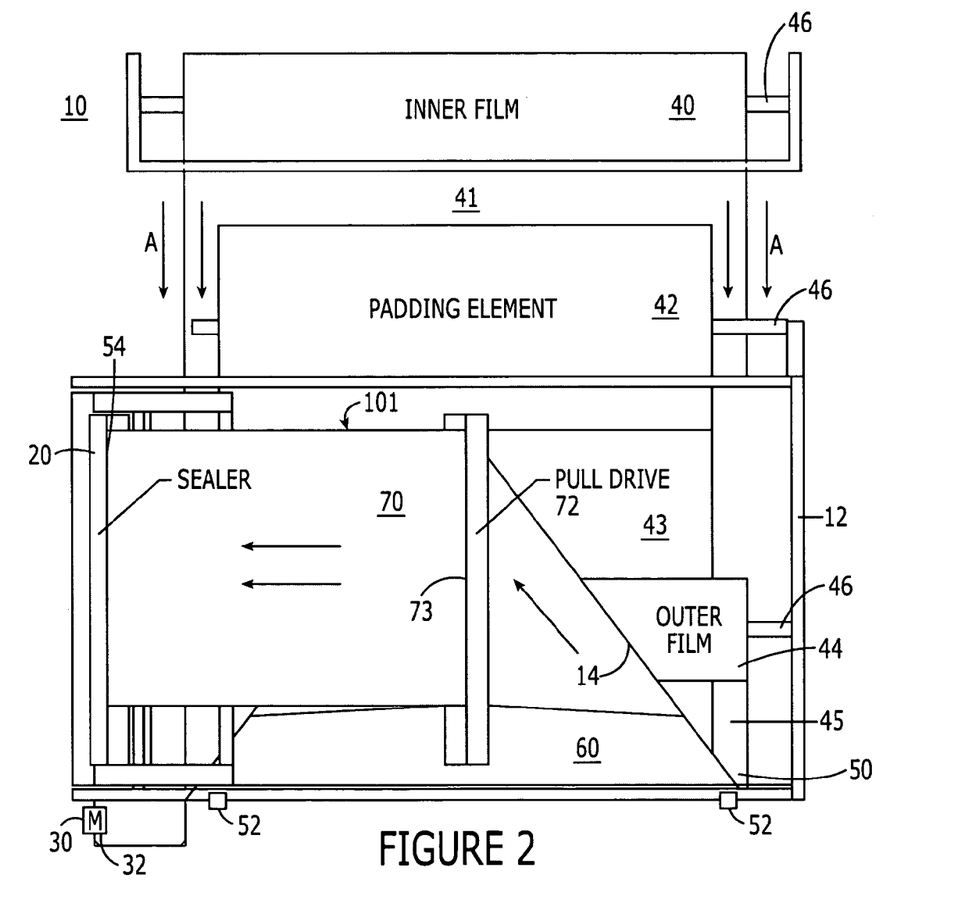
FIG. 2 is a schematic plan view of a device according to the present invention.

Referring now to FIG. 2, a system and method according to the present invention are shown in a schematic plan view. A bag-forming apparatus 10 includes a frame 12 for supporting three rolls: an inner film roll 40 feeding (in the direction of arrows A) a thermoplastic film layer 41, a padding element roll 42 feeding (in the direction of arrows A) a padding element layer 43, and an outer film roll 44 feeding (in the direction of arrows A) a thermoplastic film layer 45. Each roll is mounted on a spindle 46 that mounts the roll 40,42,44 to the frame and permits the layer 41,43,45 to be fed, either by directly driving the roll at the spindle or, more preferably, by using a pull drive apparatus 72 to draw the layers 41,43,45 through the system.

The system 10 is further provided with a knife 50 which is positioned, at a position just before the layers 41, 43, 45 are collated, to cut across the transverse extent of the padding element layer 43 (i.e., substantially perpendicularly to the feed direction defined by arrows A). Those skilled in the art to which the present invention relates will recognize that as a practical matter if the interior layer 43 is to be cut, it must be cut before the layers 41, 43, 45 are collated. The knife 50 may take any suitable form, such as a rotary cutter running along the transverse extent of the padding element layer 43, a guillotine-type cutter actuable to sever the padding element layer 43, or a similar device, and in a preferred embodiment the knife 50 is a rotary cutter.

The function of the device 10 at the knife 50 represents a critical step in the production of bags, because the knife 50 is used in order to form a window in the bag 24 by causing sections of the padding element layer 43 to be laid out discretely in the queue 100. A window is defined as a region of the bag 24 in which no padding element 43 exists, because the thermoplastic film layers 41, 45 are generally substantially transparent, while the padding element layer 43 is generally opaque. As the queue 100 is laid out, the padding element layer 43, which is continuous as it is fed from the padding element roll 42, must be cut at the point in the queue representing the leading edge of a window within a bag, and the film layers 41, 45 must be advanced while the padding element roll 42 and its associated layer 43 are held still. When the queue 100 has been advanced to the point representing the end of the window, the padding element roll 42 may be restarted, and the padding element layer 43 is again fed at the same rate as the film layers 41, 45. The knife 50 represents one of two critical cut points, at which it may be necessary to stop all motion of the queue 100 to facilitate a cut; this process will be described in greater detail below.

At the point in the queue 100 just after the knife 50, the layers 41, 43, 45 are collated and formed into a sandwich 60 that in a preferred embodiment includes at any given point along the longitudinal extent of the queue 100 two or three layers, depending upon whether or not the given point is within or without a window. At this point, because access to the interior layer is no longer required, in a preferred embodiment the longitudinal edges of the sandwich 60 are sealed shut by a means 52, 52 for longitudinally sealing that may be a heated-air sealer, a hot wire or roller, or any similar device designed to apply heat to the edge of the film layers 41, 45, sealing them to each other in a substantially continuous fashion along the edge. As can be seen in FIG. 2, the transverse or widthwise extent of the padding element layer 43 is somewhat narrower than that of the thermoplastic film layers, and the edge sealing described above is preferably performed transversely exteriorly of the padding element layer 43. This allows the padding element to move within the film envelope, the padding element being secured only at the sealed ends.

Once the queue 100 has been laid out into a sandwich 60 including discrete and longitudinally intermittent sections of the padding element layer 43 interbetween two continuous layers of thermoplastic film 41, 45, the sandwich 60 must be folded to form an envelope 70 from which the bags 24 will be finally forged. In a preferred embodiment, this step of folding is accomplished by drawing the bag queue 100 under and around an A-frame 14 and feeding the bag queue 100 through the drive rolls 72. The geometry of the A-frame 14 is designed so as to allow the two longitudinal edges of the queue 100 to be drawn together such as that the layers 41, 43, 45 are folded along their longitudinal centerline 101 at a slot 73 between the two rolls of the drive apparatus 72. The queue 100 is fed through the slot 73 and advanced in a sidelong fashion toward the seal-cutter apparatus 20.

The queue 100 is directed toward the seal-cutter apparatus 20, which forms the aforementioned second cut point 54. Whereas the first cut point 50 is arranged to cut only the interior layer of padding element 43, the second cut point 54 is arranged to seal and cut across the entire transverse extent of the envelope 70. As the seal-cut is accomplished, the trailing end of a leading bag 24 and the leading end of a trailing bag 24 are formed simultaneously by fusing the padding element layer 43 and the film layers 41, 45 together in a permanent relation, and the two bags are at least partially severed from each other. The structure and operation of cut point 54, including particularly that of the seal-cutting apparatus 20, will be described in greater detail below.

A further member of the bag-forming apparatus 10 is a control pad 30 that contains a user input and display and a microprocessor control 32. The microprocessor control 32 is designed and arranged to control a number of operations associated with the bag-forming apparatus 10 and, more importantly, to coordinate those operations over time and distance to form bags of varying characteristics and dimensions.

As can be seen in FIGS. 1 and 2, the decision to cut-and-not-feed the padding element layer 43 in order to form a window must be made at the knife 50 and before the sandwich 60 is formed and folded. However, the distance required for efficient forming and folding of the sandwich is greater than the distance between the leading edge of a typical bag and the cut point 50 for the window. This factor in combination with the need to produce bags having different lengths and different window configurations means that the machine 10 may not simply cut-and-not-feed the padding element layer 43 at a regularized point in the queue. As a corollary consequence, as will be seen in the description referring to FIG. 3, the bag that is ordered by the user is not the next bag ejected from the machine. Instead, bags are held in queue in various stages of formation until they have been forced forward by later orders to be finally finished and ejected from the machine. Depending upon the size of the machine, the size of the bags ordered, and the length of the queue, a bag ordered at a given time may be the second, third, tenth, or twentieth bag to come off the line after the order. The ordered bag's position in the queue is determined by the number of bags ordered before the ordered bag yet still in the queue. That is, bags are produced on a first-ordered, first-out basis, but the bags are released from the queue only as a sufficient queue of bags is maintained behind them.

Figure 3:
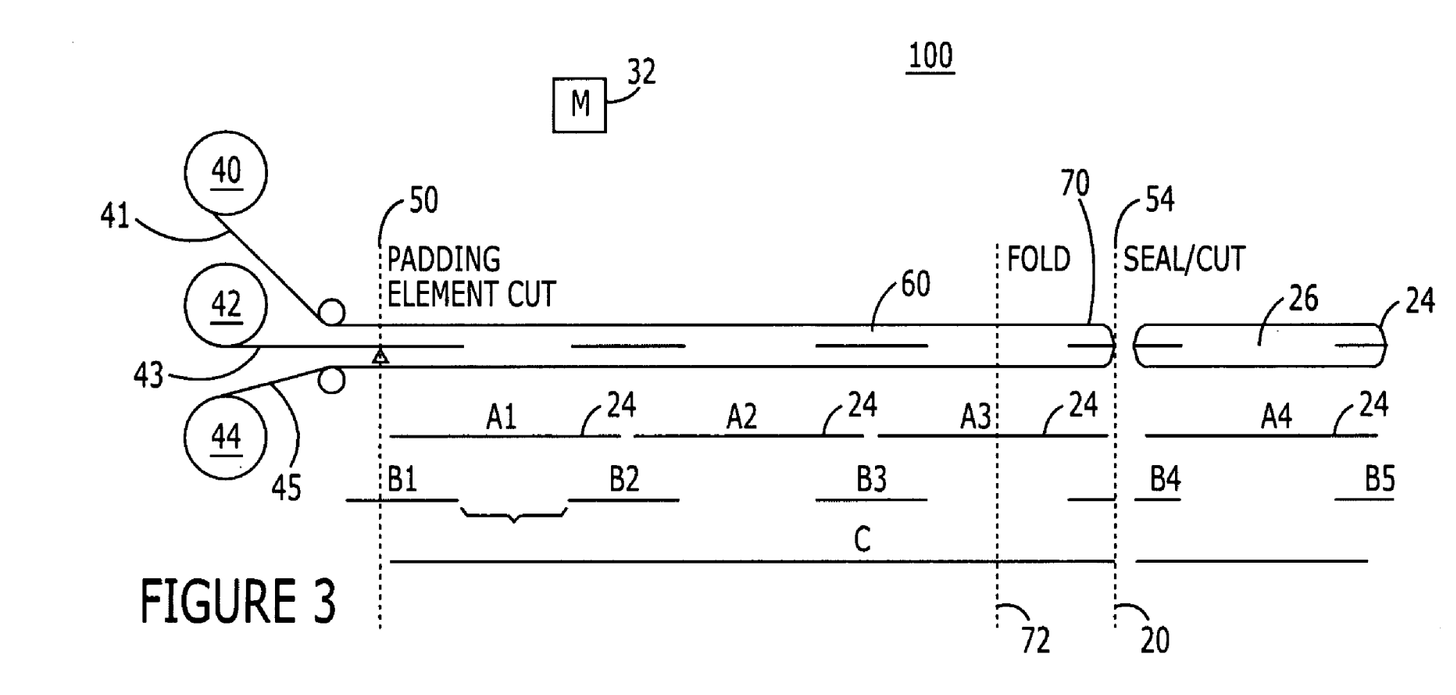
FIG. 3 is linearized schematic timeline view of a method of the present invention.

Referring now to FIG. 3, a schematic depiction of the queue 100 demonstrates the decisioning process associated with the microprocessor control 32 as well as the lengths and arrangements of sections of the padding element layer 43 in relation to the intended size of the bags 24 so as to provide for windows within the bags 24. Those skilled in the art to which the present invention relates will recognize that no particular scale or arrangement in FIG. 3 is intended, and that the elements shown are shown for illustrative rather than limiting purposes.

Line A as indicated by sections A1, A2, A3, etc. indicates the intended size of a series of bags 24 lined up within the queue 100. Line B, as indicated by sections B1, B2, B3, etc., indicates the length and placement of sections of the padding element layer 43 within the queue 100. The space between sections B1, B2, B3, etc., will become windows 26 in the bags 24. Line C is a solid line representing the continuous nature of the film layers 41, 45.

As can be seen in FIG. 3, film rolls 40, 44 and padding element roll 42 feed layers 41, 43, 45 to a cut point 50, whereat the padding element layer 43 may be selectively cut (and, contemporaneously, the padding element roll 42 held idle) to form a window 26 for one of the bags 24. This cut takes place before the layers 41, 43, 45 are collated to form a sandwich 60 that includes the film layers 41, 45 disposed about the padding element layer 43. Under the control of microprocessor control 32, the forward progress of the queue 100 is stopped in all layers to facilitate the cut at cut point 50. The queue then advances until an event that requires it to stop again.

Because the distance from the cut point 50 to the seal-cut point 54 is larger than the length of a bag 24, principally because the folding process requires a significant distance, a number of bags are held within the queue 100. As the queue advances, if the designated location for forming a seal-cut reaches the seal-cut point 54, then the queue must be stopped, again under the control of microprocessor control 32, to facilitate the seal-cut to complete the processing of one bag 24 and to seal the leading edge 25 of the next bag 24 in the queue.

The microprocessor control 32 is primarily responsible for receiving bag orders and coordinating the operation of the apparatus 10 according to the following parameters:

(a) when and how far to advance the film layers 41, 45 and the padding element layer 43;

(b) when and for how long to stop the advancement of the queue to make a cut at knife 50 to begin forming a window 26;

(c) when and for how long to advance the film layers 41, 45 while holding the padding element layer 43 idle to form the window 26;

(d) when to resume advancing the padding element layer 43 to end the window 26;

(e) when and for how long to stop the advancement of the queue to make a seal-cut at cut point 54 using seal-cutting apparatus 20; and (f) when to resume advancing all film layers in response to a new bag order, which serves to force queued bags 24 forward through the stages of processing.

Those who are skilled in the art will appreciate that the decisions to stop or start the queue 100, to advance or not to advance the padding element layer 43, to actuate the knife 50, or to actuate the seal-cutter 20 may be made at any given time depending upon whether a decision point (primarily, an end of a bag 24 or an end of a window 26) has reached an action point (primarily, a cut point 50, 54) within the queue 100. The positioning of the decision points with regard to the action points is largely a question of a selected bag length and a selected bag characteristic (such as having a window or not having a window, or having a window that extends to the end of the bag).

Therefore, in a preferred embodiment of the present invention, a series of bags 24 is formed by selectively advancing the film rolls 40,44 and selectively advancing or not advancing the padding element roll 42 in order to arrange a linear, longitudinally traveling queue 100 of layers of film 41,45 and padding element 43 according to the desired bag characteristics and dimensions; selectively cutting the padding element 43 at a first cut point 50 to form, in combination with the step of selectively not advancing the padding element roll 42, a window 26 for one of the bags 24; forming a sandwich 60 comprising the layers of film 41,45 disposed about the padding element 43; forming an envelope 70 wherein the sandwich 60 is folded longitudinally about a centerline 101 thereof; selectively forming transverse seal-cuts 53 across the envelope 70 at a second cut point 54 to form the bag 24 according to the desired bag characteristics; and selectively advancing or stopping the queue 100 to facilitate the step of cutting the padding element 43 or the step of selectively forming one of the transverse seal-cuts 53, according to a position of the queue 100 with respect to one of the cut points 50,54.

Figure 4:
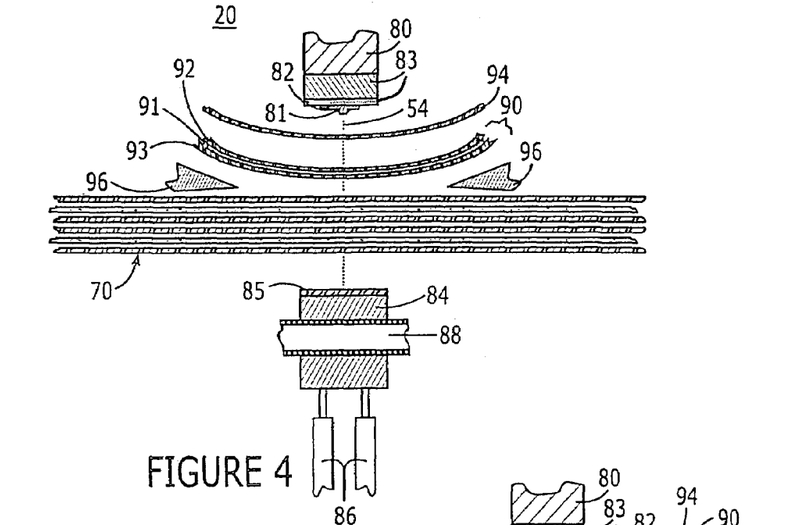
FIG. 4 is a cross-sectional detail view of a seal-cut mechanism according to the present invention.

Referring now to FIGS. 4–6C, and more specifically to FIG. 4, a seal-cutting method and apparatus according to the present invention is shown in greater detail, with exaggerated relationships to show the operational qualities of the device more clearly. Those skilled in the art will recognize that the seal-cutting method described and claimed herein is of particular utility in forming bags according to the present invention, but is also susceptible of utility in other bag-forming applications. As shown in FIG. 4, the seal-cut apparatus 20 is disposed at the second cut-point 54, at which sections of the envelope 70 are cut into bags 24 (see FIG. 5G). The seal-cut apparatus 20 includes a seal bar 80 that is composed of aluminum, steel, or a similar strong, substantially inflexible, and heavyweight material. Aluminum is preferred for its heat dissipation capabilities. Only a portion of seal bar 80 is shown, but the particular configuration of seal bar 80 is determined in relation to the overall structure of the machine, a wide variety of configurations being possible without departing from the scope of the invention. The seal bar 80 is attached to the frame 12, either directly or indirectly, and is provided with a tip or sealing surface 82 made of a suitable electrically resistive material such as Nichrome. Ideally the tip 82 will be selected to be of a material capable of producing a desired amount of heat when an electrical current is developed across it, either on a timing basis or in conjunction with a proportional-integral-derivative (PID) controller. The tip 82 is, in a preferred embodiment, the member of the seal-cut apparatus 20 which will perform the sealing and cutting operations.

As can be seen in the figures, the profile of the seal bar 80 is substantially wider than the width of the tip 82. This provides a region of compression on either side of the tip 82 across which no heat is being applied. This is of particular importance to one aspect of a preferred embodiment of the present invention, namely, that the padding element layer 43 is compressed and held fast without heat so that the heat of the tip 82 during seal-cutting does not cause the foam to pull away from the sealing region. This process will be described in greater detail below.

The tip 82 of the seal bar 80 is provided with a central ridge 81 for increasing the clamping pressure along a cut line between the bags 24. As will be described in greater detail below, the central ridge 81 serves to increase, in a localized fashion, the application of pressure to the envelope 70. The increased pressure in the region of the central ridge 81 will, in combination with the heat to be applied, be sufficient to cut the bags 24 apart, and that increased pressure forms the difference between the cutting action of the seal-cut apparatus in the central ridge region and the sealing action of the same apparatus in the regions of the tip 82 outside the central ridge region.

Because a preferred seal bar 80 is electrically and thermally conductive, an insulating member 83 made of any suitable material is provided between the tip 82 and the remainder of the seal bar 80, so that the tip 82 is electrically and thermally isolated from the remainder of the seal bar 80. An anvil 84 is mounted in opposing relationship to the seal bar 80 and in a preferred embodiment is designed to be driven against the seal bar 80 to apply a selected pressure to the envelope 70 during the course of making the seal-cut. The anvil 84 may be driven in a variety of ways, such as by using a set of pistons 86 or by expanding a flexible but sturdy tube 88 such as a fire hose to apply the desired pressure, or a combination of the two. The anvil is preferably made of steel, aluminum, or some other substantially inflexible material and is in a preferred embodiment provided with a nonstick, compressible, compliant, non-conductive surface 85 which will contact the envelope 70. The surface 85 is in a preferred embodiment formed of silicon rubber.

Those skilled in the art will recognize that it is equally possible to drive the seal bar 80 to induce the pressure at the seal-cut point 54, without departing from the scope of the invention.

In order to prevent the seal bar 80 and more specifically the tip 82 from sticking to the envelope 70 during the course of making the seal-cut, a nonstick member 90 is interposed between the tip 82 and the envelope 70. The nonstick member 90 is capable of transmitting heat therethrough and is in a preferred embodiment a sheet of glass cloth 91 which has been coated on both sides 92,93 with Teflon® or a similar nonstick material to facilitate the release of the tip 82 from the envelope 70 at the conclusion of the operation.

An optional set of heat-conducting members 94 may be interposed between the tip 82 and the nonstick member 90 in order to produce a perforated cut in a manner that will be described in greater detail below. Also, one or two stripper plates 96 are actuable to strip the envelope 70 (now bags 24) from the nonstick member 90 if required, as discussed below.

Figure 5A:
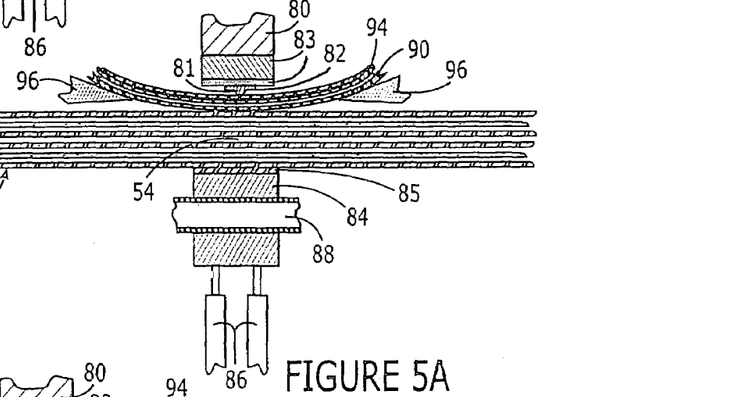
FIGS. 5A to 5G are a series of cross-sectional detail views of the operation of a seal-cut mechanism as in FIG. 4.
Figure 5B:
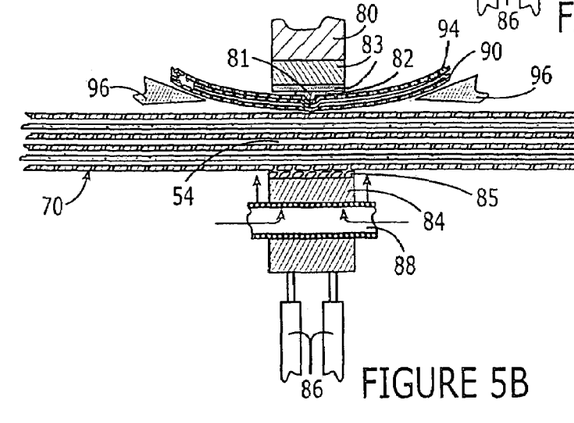
Figure 5C:
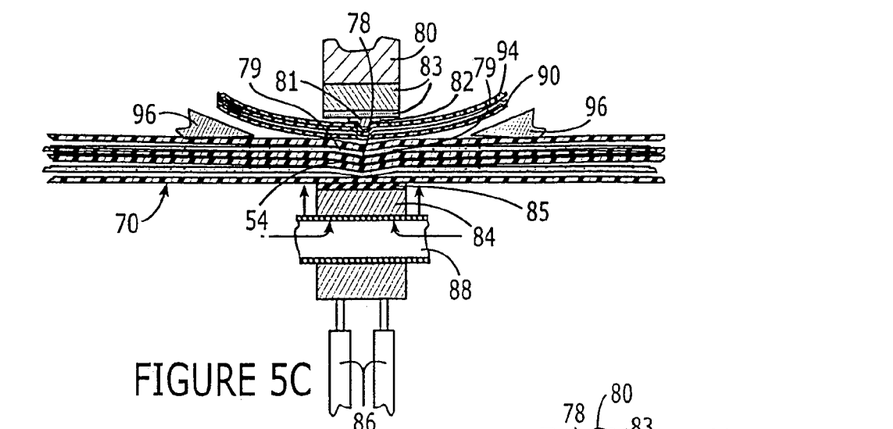

Referring now to FIGS. 5A–5G, the steps of a method according to the present invention are shown in a series of cross-sectional views in an exaggerated scale for clarity, as in FIG. 4. In FIG. 5A, the tip 82 is cool, and more specifically below the softening point of the plastic. The envelope 70 has been drawn across the seal-cut point 54 to the point in the envelope 70 at which the seal-cut is to be made. The anvil 84 is driven toward the tip 82 and the various members disposed between the tip 82 and the anvil are collapsed into contact with each other. In FIG. 5B, the fire hose 88 is expanded to begin applying pressure at the seal-cut point 54. As can be seen in FIG. 5C, the application of sufficient pressure to compress the envelope 70 produces a region 78 of concentrated pressure at the central ridge 81 of the tip 82 and, on either side of the ridge 81, regions 79 of lesser pressure. Although the pressure in the regions 79 is less than at the region 78, the pressure in regions 79 is sufficient to compress the padding element to a near-solid state to facilitate the heat transfer necessary to form the seal. As can be seen in the figure, the sear bar itself exerts pressure upon the padding element outside the pressure regions 79,81 to hold the padding element in place as the heat is applied via the seal band 82. This prevents the padding element from pulling away from the seal, as would occur if a hot seal band 82 were applied directly to the envelope 70, or if the seal band 82 were heated without this compression.

Figure 5D:
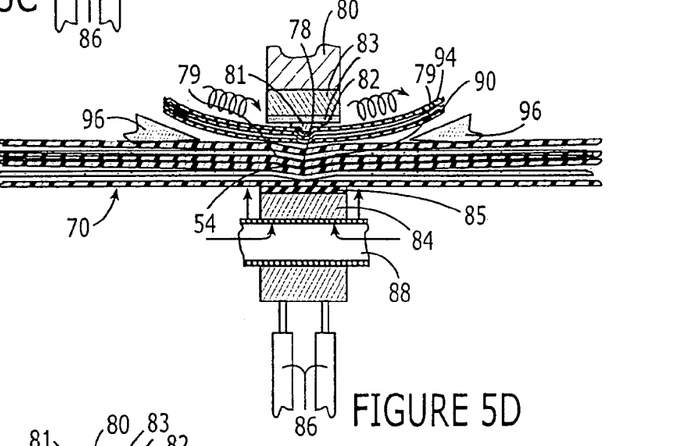

In FIG. 5D, with the envelope 70 compressed in a concentrated fashion at region 78 and in a lesser fashion at regions 79, the seal bar tip 82 is heated to a temperature sufficient to sever, at least partially, the envelope 70 into two bags 24 at the seal-cut point 54, and to capture the padding element layers 43 sealingly into the film layers 41,45 on either side of the seal-cut point 54.

Figure 5E:
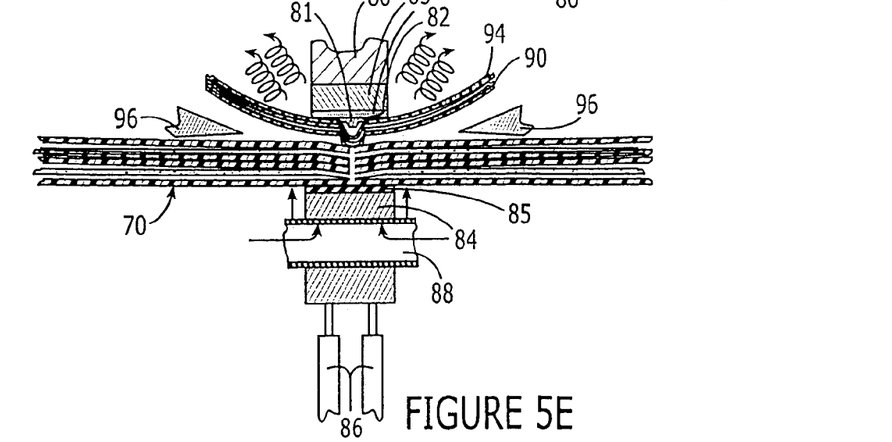
Figure 5F:
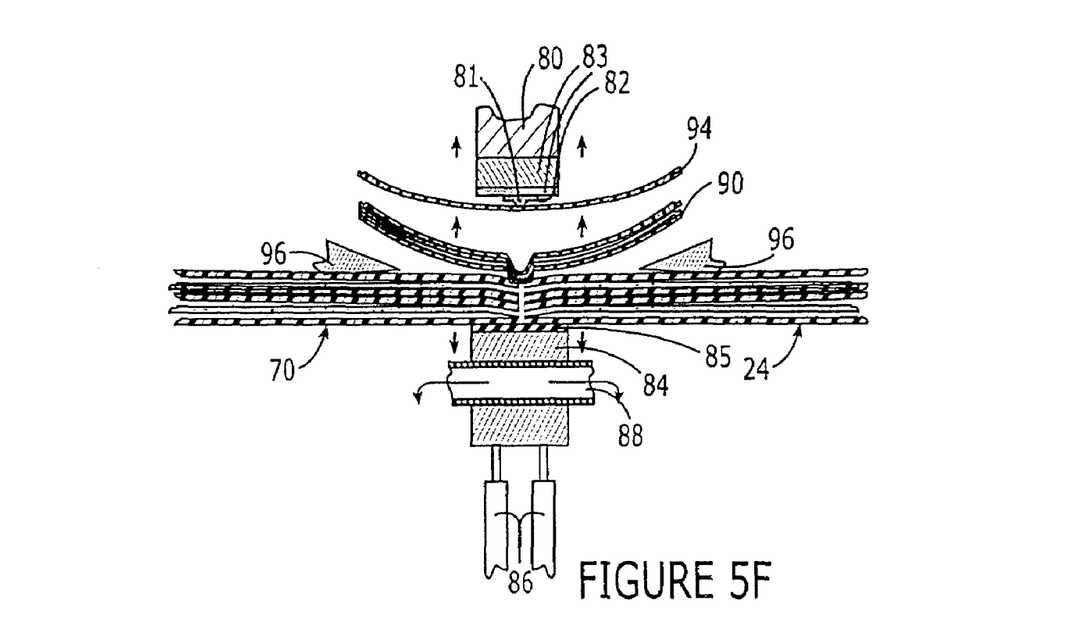
Figure 5G:
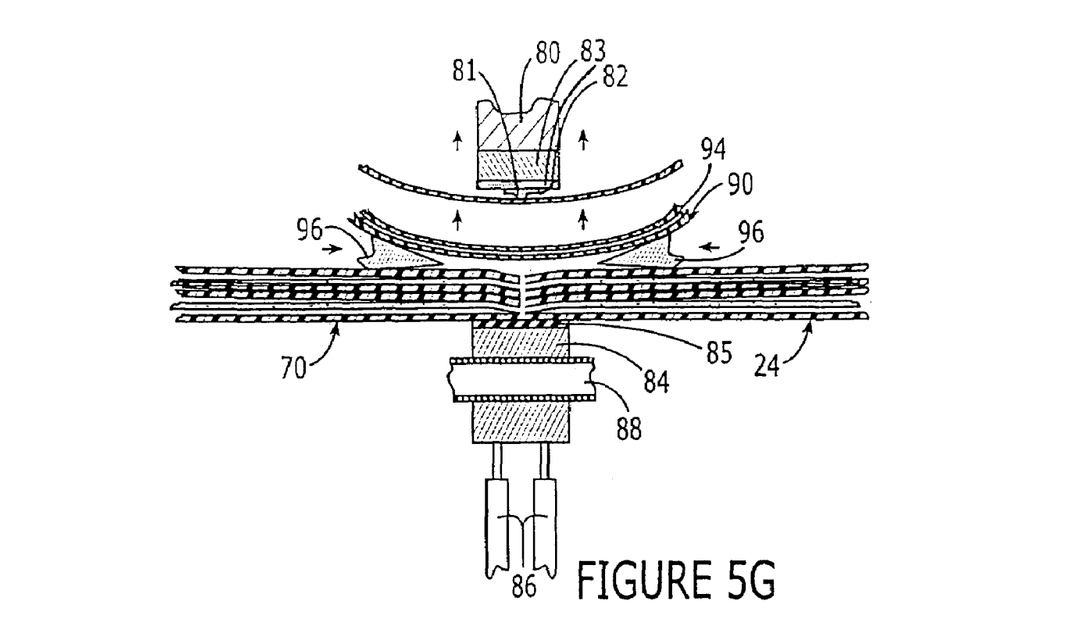

As shown in FIG. 5E, once the seal bar tip 82 has dwelled upon the envelope 70 for a sufficient time to permit the seal-cut to be made, the tip 82 is allowed to cool (or actively cooled) to a cool temperature below the softening point of the plastic prior to retracting the anvil 84. This step allows the seal to set firmly under continued pressure without allowing the unmelted portion of the padding element layers 43 to separate from the seal. Once the seal bar tip 82 has cooled to the desired temperature, the pressure is removed and the anvil 84 is retracted (see FIG. 5F). Because the nonstick member 90 may be releaseably stuck to the envelope 70, the stripper plates 96 maybe actuated toward the seal-cut point 54 in order to separate the nonstick member 90 from the envelope 70, now bags 24 (see FIG. 5G).

Figure 6A:
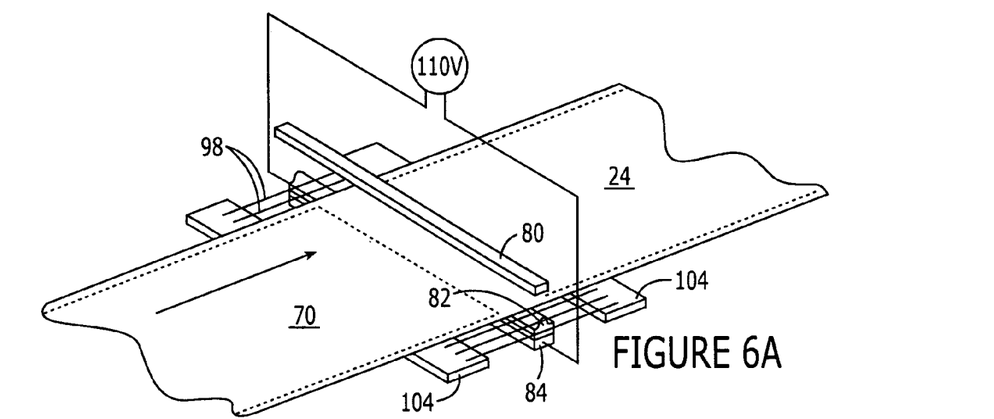
FIGS. 6A to 6C are partially schematic perspective views of an alternative embodiment of the present invention.
Figure 6B:
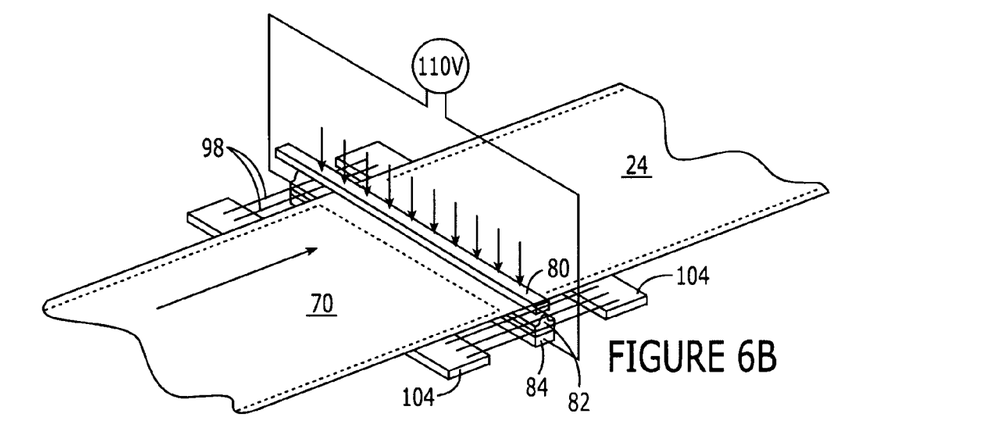
Figure 6C:
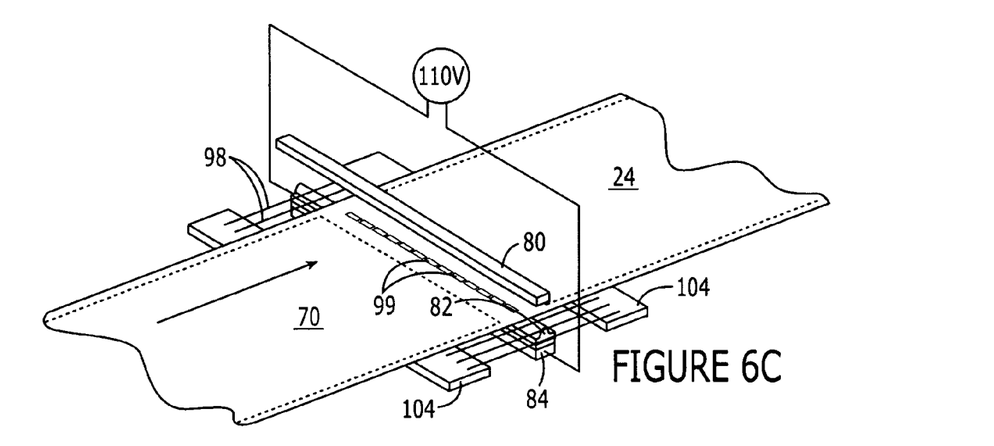

Referring now to FIGS. 6A–6C, an alternative embodiment of the present invention is shown in a partially schematic perspective view. In this alternative embodiment, the seal-cut between bags is a perforated cut, and this embodiment is particularly suited for a higher volume of bag production in which it might be useful to place the bags upon a roll or to have a series of connected bags. As can be seen in FIG. 6A, the seal bar 80 with its resistive tip 82 has an electrical current connected across it. Although a 110VAC source is shown for illustrative purposes, any suitable voltage, with alternating or direct current of a corresponding amperage depending upon the resistance of the seal band 82, may be chosen, according to the formulae $V=IR$ and $P=I^2R$, as those skilled in the art will recognize, such that the appropriate amount of heat is produced. In the illustrated embodiment, a set of heat-conducting members 98 have been disposed across the tip 82.

In various preferred embodiments, the heat-conducting members 98 are spring wires or spring bands. The particular material from which the heat-conducting members 98 are fabricated and the characteristics of those heat-conducting members will be selected primarily based upon the composition of the film layers 41,45 and the padding element layer 43. A thin or a thick heat-conducting member 98, corresponding to the horizontal width of the regions 99 in which film layers 41,45 and the padding element layer 43 remain unsevered, will be chosen depending upon the ease with which the two bags 24 may be separated by tearing through those unsevered regions 99. For instance, if the padding element is a polyethylene foam, then a wider heat-conducting member 98 might be used since a foam padding element would be easier to tear than, for example, a polyester padding element.

The heat-conducting elements 98 are electrically and thermally isolated from each other and from the remainder of the apparatus 10, preferably by embedding the ends thereof into blocks 104 of Formica or another suitable insulator, so as not to develop an electrical short circuit. This arrangement is preferred because the heat-conducting elements 98 will directly contact the electrically energized, heated tip 82.

Referring now to FIG. 6B, the anvil 84 is driven to develop a pressure between the anvil 84 and the seal bar 80. As the seal bar tip 82 is heated, however, a portion of the heat of the tip 82 is drawn off, in a localized fashion, by the heat-conducting members. This arrangement creates a circumstance in which the heat in the regions of the heat-conducting members 98 is insufficient to sever the envelope 70 in those sections. Consequently, those sections remain integrated, and the resulting bags 24 remain connected by a perforated cut 97 (see FIG. 6C).

Figure 7:
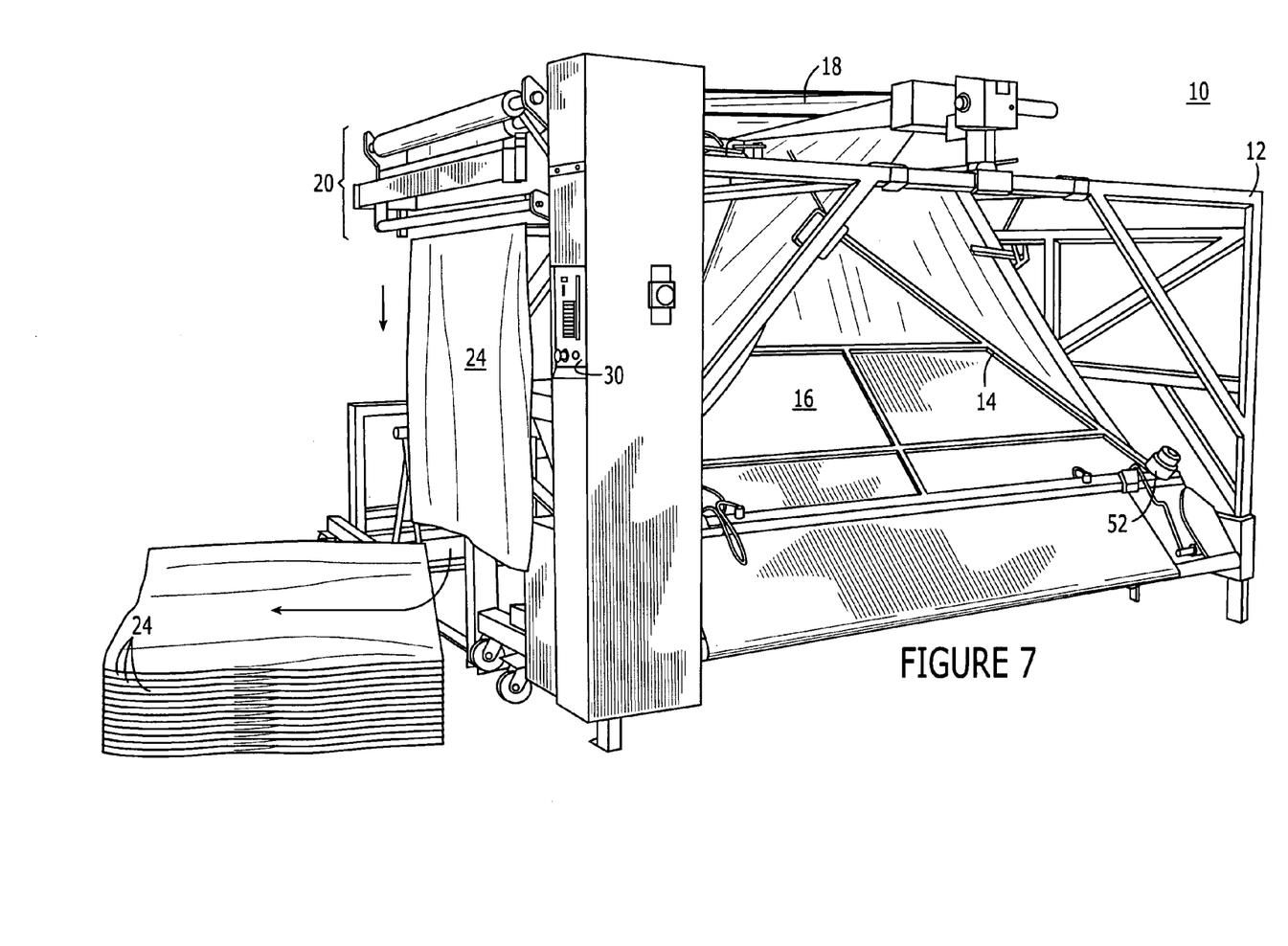
FIGS. 7 and 8 are environmental views of alternative embodiments of the present invention in operation.
Figure 8:
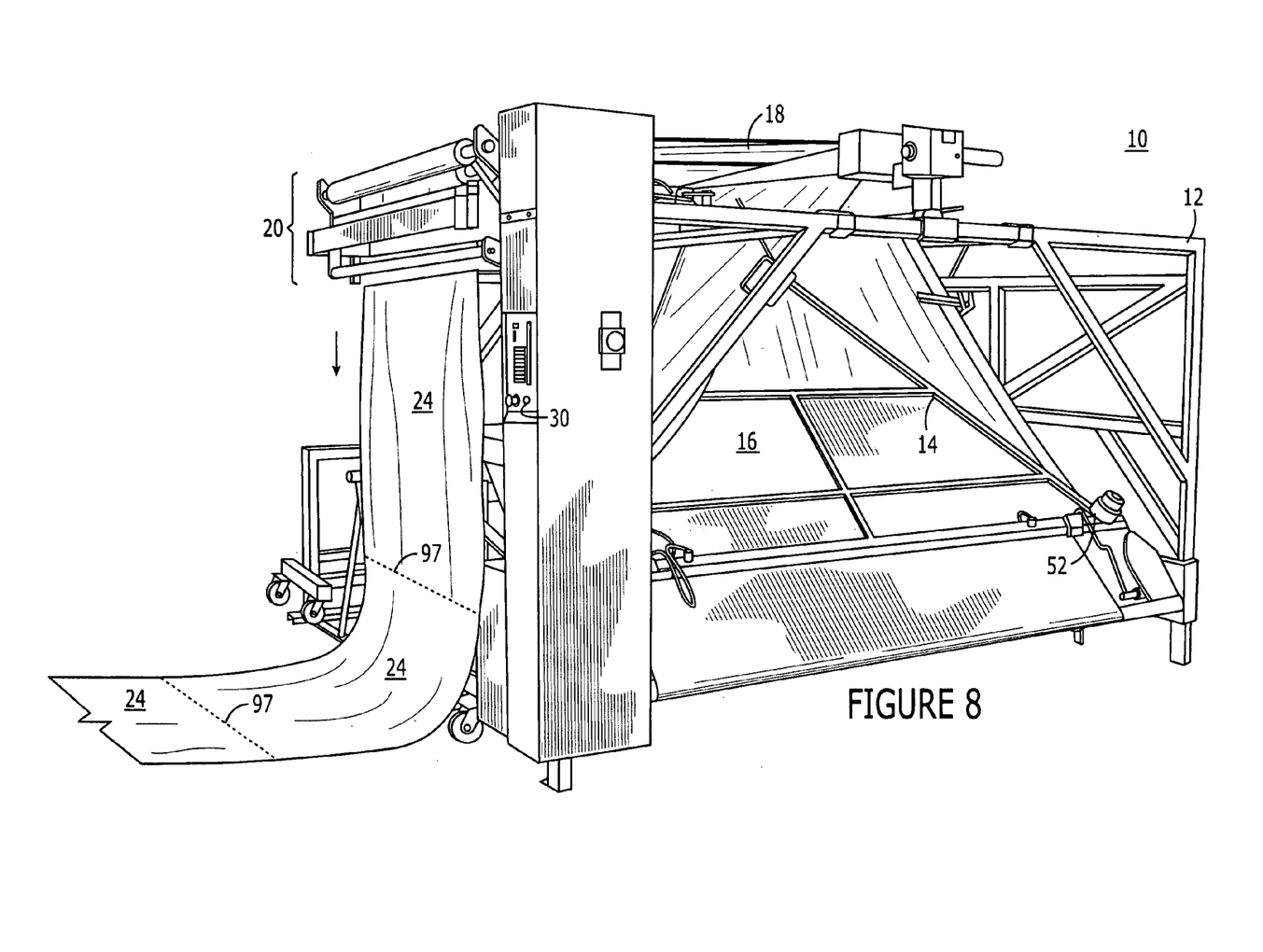

Referring now to FIGS. 7 and 8, alternative environmental views of the present invention show a system and method wherein a series of disconnected bags 24 (as in FIG. 7) or a series of bags 24 connected by perforations 97 (as in FIG. 8) may be produced.

In addition to the information provided above, those skilled in the art will recognize as a practical consideration that the heating element 82 expands when heated. Sufficient pressure should be applied to the anvil 84 and/or the seal bar 80 in order to prevent the heating element 82 from warping, because even a slight incomplete contact between the heating element 82 and the envelope, opposed by the anvil, prevents the full solid-state compression of the padding element, which in turn inhibits heat transfer and prevents an effective seal.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method of forming seal-cuts to form a bag for a bulky article by sealing ends of a film envelope comprising a folded sandwich of a layer of padding element disposed interbetween a pair of layers of thermoplastic film; the method comprising the steps of:

interposing the envelope between a sealer bar and an anvil, the sealer bar having an initial temperature below a softening point of the film and comprising a sealing surface including a ridge projecting therefrom for increasing clamping pressure along a cut line;

applying a selected clamping pressure across a clamping profile wider than the sealing surface of the sealer bar for clamping the layers of the film envelope between the sealer bar and the anvil, the selected clamping pressure being sufficient to substantially fully compress the layer of padding element;

then heating the sealing surface to a selected sealing temperature, whereat the layer of padding element is captured in the layers of thermoplastic film in the region of the sealing surface and the envelope is at least partially severed in the region of the ridge to define two bags;

then cooling the sealer bar to a temperature below the softening point;

maintaining the selected clamping pressure across the clamping profile during the cooling step to set the layer of padding element firmly within the bags; and removing the clamping pressure.

2. The method of claim 1, further comprising the step of: interposing a nonstick member between the sealer bar and the envelope.

3. The method of claim 1, further comprising the step of: interposing a plurality of heat conducting members between the sealer bar and the envelope to form retention regions connecting the two bags, such that the seal-cut is a perforation.

4. The method of claim 3, wherein the heat conducting members comprise spring wires.

5. The method of claim 3, wherein the heat conducting members comprise spring bands.

6. The method of claim 1, wherein the step of applying a selected clamping pressure comprises applying the pressure to the anvil.

7. A method of forming seal-cuts to form a bag for a bulky article by sealing ends of a film envelope comprising layers of thermoplastic film; the method comprising the steps of:

interposing the layers of thermoplastic film between a sealer device and an anvil, the sealer device comprising a plurality of spaced-apart heat dissipating members configured to be non-penetrating to the layers of thermoplastic film;

applying a selected clamping pressure between the sealer device and the anvil for clamping the layers of thermoplastic film therebetween without penetrating the heat conducting members through the layers of thermoplastic film;

heating the sealer device to a selected sealing temperature sufficient to form heat-sealed cuts in the layers of thermoplastic film intermediate the heat dissipating members, the heat dissipating members conducting a sufficient portion of the heat from the sealer device away from the layers of thermoplastic film in contact with the heat dissipating members to prevent formation of heat-sealed cuts thereat, thereby forming discrete spaced-apart heat-sealed cuts in the layers of thermoplastic film collectively defining a perforation line;

cooling the sealer device; and removing the clamping pressure.

8. The method of claim 7, wherein the heat conducting members comprise spring wires.

* * * * *